United States Patent [19]

Harrigan et al.

[11] Patent Number: 4,701,027
[45] Date of Patent: Oct. 20, 1987

[54] DISPLAY DEVICE WITH INCREASED VIEW ANGLE

[75] Inventors: Michael E. Harrigan; John A. Durbin, both of Webster; Ross E. Schroll, East Rochester, all of N.Y.

[73] Assignee: Xerox Corporation, Stamford, Conn.

[21] Appl. No.: 931,486

[22] Filed: Nov. 17, 1986

[51] Int. Cl.[4] .............................................. G02F 1/13
[52] U.S. Cl. .............................. 350/334; 350/331 R; 350/339 R
[58] Field of Search ............... 350/331 R, 334, 339 R, 350/345

[56] References Cited

U.S. PATENT DOCUMENTS

| 4,126,382 | 11/1978 | Barzilai et al. | 350/331 |
| 4,365,869 | 12/1982 | Hareng et al. | 350/345 |
| 4,367,467 | 1/1983 | Emile, Jr. | 340/765 |
| 4,443,819 | 4/1984 | Funada et al. | 358/236 |

FOREIGN PATENT DOCUMENTS 0479155 10/1975 U.S.S.R. ............ 350/331 R

Primary Examiner—Stanley D. Miller
Assistant Examiner—Richard F. Gallivan

[57] ABSTRACT

A display device incorporates an optical demagnifying component adjacent the display surface. The optical component forms a demagnified real or virtual image of the display formed at the display viewing surface, effectively increasing the view angle of an observer.

3 Claims, 4 Drawing Figures

DISPLAY DEVICE WITH INCREASED VIEW ANGLE

This invention relates to a display device and more particularly, to an image bar such as a liquid crystal shutter (LCS) with an increased view angle.

BACKGROUND OF THE INVENTION

Display devices such as LCSs and light emitting diodes (LEDs) are well known in the art having applications ranging from wrist watch displays to calculators. One disadvantage of these devices is that in order to read the display, an observer must be oriented in a fairly narrow viewing angle. This is a disadvantage when the display is located, for example, in a fixed location in a machine control panel. Depending upon the height of the observer and the viewing distance, optimum viewing of the panel is achieved only by some additional compensations by the observer. It would be desirable to make such display devices more readily viewable. According to one embodiment of the invention, the relatively narrow viewing angle of a liquid crystal display is effectively increased by producing a reduced real or virtual image by introducing a demagnifying optical component into the display.

It is known in the art to increase the viewing angle of an LCS by optimizing luminous response as disclosed in U.S. Pat. No. 4,126,382. A liquid crystal cell is formed between two polarizing devices. Short duration pulses are applied to the device, creating a near-optimum luminous response. In U.S. Pat. No. 4,443,819 a magnifying lens is positioned in front of an LCS panel used in a television system. The lens magnifies the image on the display area and reduces the field of view. Another magnification technique is described in U.S. Pat. No. 4,365,869 wherein multiple lens plates project an image from an LCS onto a large screen. This method will also reduce the field of view. U.S. Pat. No. 4,367,467 discloses an LCS assembly which uses an optical assembly located between the liquid crystal layer and the display plane to improve display parallax.

None of the above prior art references discloses an image bar type of display incorporating a demagnifying optical component.

SUMMARY OF THE INVENTION

More specifically, the invention is directed towards an image bar display comprising:
a display panel disposed in a viewing plane;
means for providing a light output at said display panel; and
an optical device placed adjacent the display side of said panel, said optical device adapted to increase the view angle of the displayed image by decreasing the size of the displayed image in at least one direction.

BRIEF DESCRIPTION OF THE DRAWING FIGURES

FIG. 1 shows a prior art liquid shutter display.
FIG. 2 illustrates the principles of a demagnifying optical system.
FIG. 3 shows one embodiment of a liquid crystal shutter display assembly according to the invention which incorporates a negative cylinder lens as the demagnifying component.
FIG. 4 is an enlarged view of the negative cylinder lens of FIG. 3.

DETAILED DESCRIPTION OF THE PREFERRED EMBODIMENT

Figure 1:
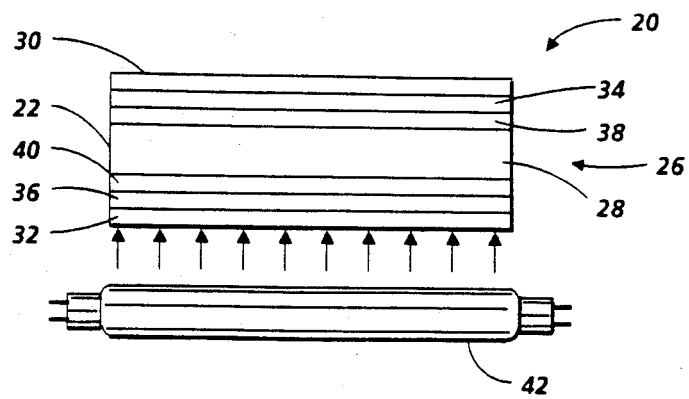

FIG. 1 shows a display device representative of prior art panels. As shown, display panel 20 comprises a housing 22. A liquid crystal shutter (LCS) device 26 comprises, for example, a combination of a liquid crystal cell 28 with polarizing plates 30 and 32 disposed at both sides of the cell 28, the cell 28 comprising two transparent substrates 34 and 36, having at the opposite surfaces thereof electrodes 38 and 40, composed of transparent conductive films respectively. The electrode 38 functions as the electrode in common and segment electrodes 40 are disposed linearly.

In its nonoperative state, the liquid crystal molecular axis is perpendicular to the polarization axes of polarizing plates 30 and 32 and the liquid crystal material is opaque, but when the predetermined record signal is given to apply voltage between the common electrode 38 and the selected segment electrode 40, the liquid crystal molecular axis changes orientation and becomes parallel to the polarization axes of polarizing plates 30 and 32, thereby becoming transparent. At this time, a light source 42 behind the liquid crystal optical shutter 26 is energized. Light passes through the polarization plate 32 and the transparent portion of liquid crystal 25 and the polarizing plate 38 sequentially. An image of the LCS output (typically alphanumeric characters) is then visible on display 26. This image must be viewed through a relatively small viewing angle.

Figure 2:
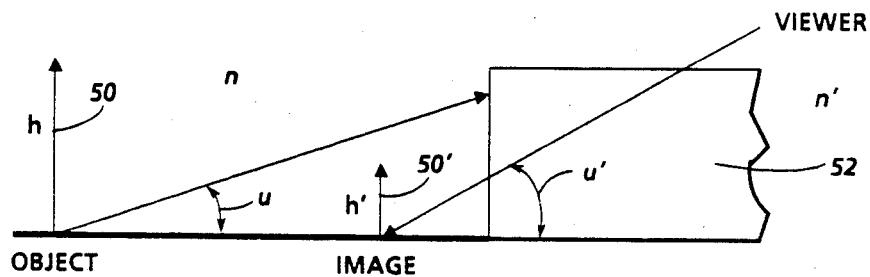

According to one aspect of the invention, the viewing angle is widened by introducing an optical component into the display panel which produces real, or preferably virtual, demagnified images at the view plane. To better understand this feature of the invention FIG. 2 shows an optical system which demonstrates a fundamental law of optics called the optical invarient. If an object 50 of height h is viewed through an optical system 52 which produces a reduced image 50' of height h', then the view angle u' leaving the optical system 52 related to the angle u, leaving the object by the equation:

$$nh \sin(\mu) = n'h' \sin(\mu') \quad (1)$$

The magnification (m) which is the image height divided by the object height, is expressed as:

$$m = \frac{h'}{h} = \frac{n \sin(\mu)}{n' \sin(\mu')} \quad (2)$$

Usually, $\mu$ and $\mu'$ are both in air so $n = n' = 1$ and $$1/m = \frac{\sin(\mu')}{\sin(\mu)} \quad (3)$$

As Equation (3) shows, to make $\mu$ large, m should be small.

Figure 3:
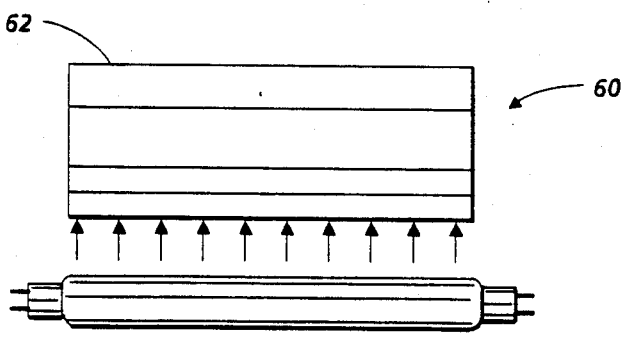
Figure 4:
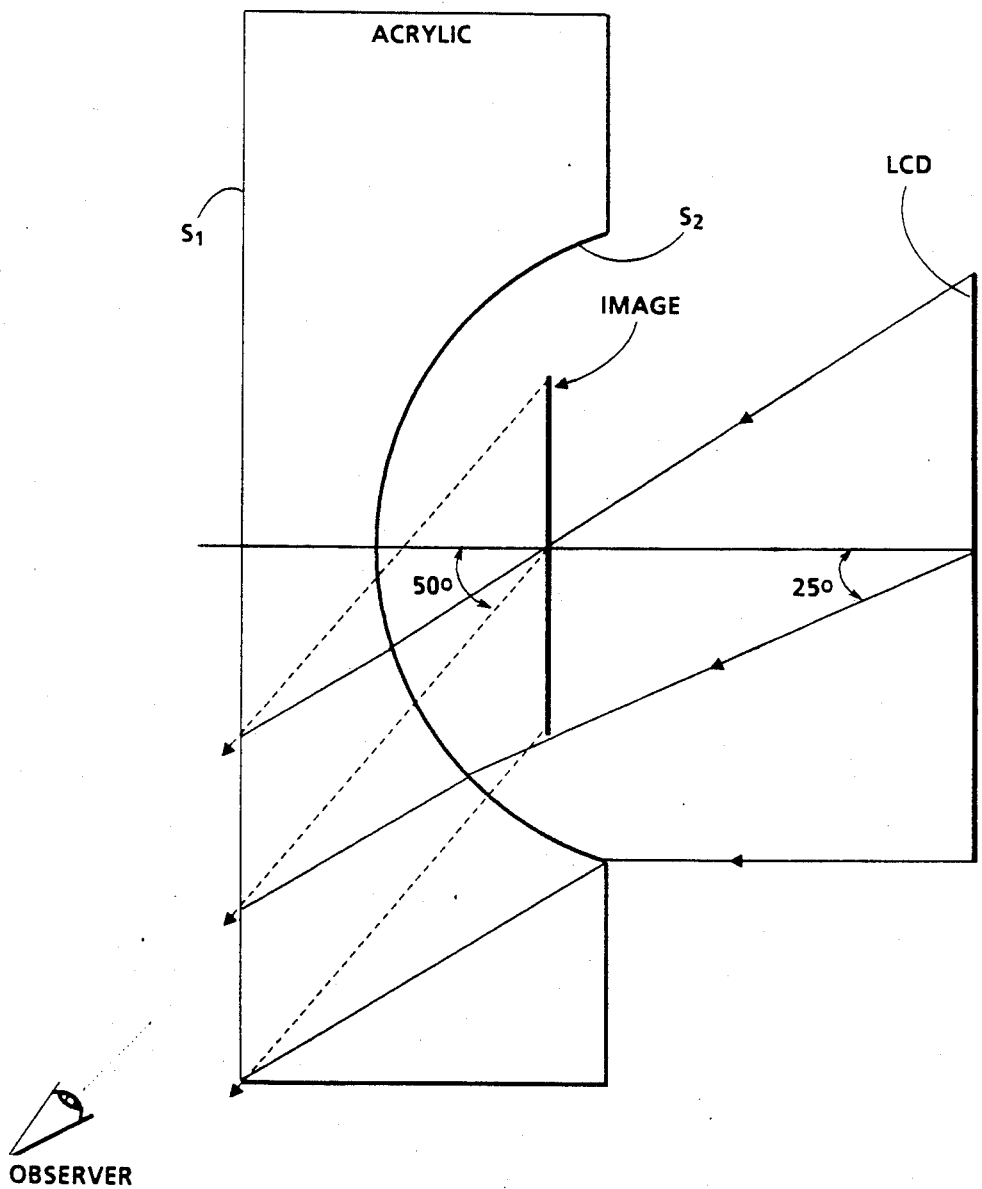

FIG. 3 shows one embodiment of an LCS display panel 60 which incorporates a negative cylinder lens 62 as the demagnifying optical component. Lens 62 has power in one direction and forms a demagnified virtual image within the display. The view angle of an observer is thus effectively widened. FIG. 4 shows, as one example, a field of view increased from 25° to 50° while the image is reduced by 2×. The table below provides the construction data for lens 62 for this example.

| SURF | RADIUS (mm) | THICKNESS (mm) | GLASS | CONIC CONSTANT | SEMI APERTURE (mm) |
|---|---|---|---|---|---|
| $S_1$ | −219.9937 | 2.0 | Acrylic | 0. | 7.85 |
| $S_2$ | 5.2603 | 8.715 | Air | .057 | 4.83 |

Other optical systems which may be used as the demagnifying optical component are, for example, a negative spherical lens or a plastic strip lens array. The strip lens array, disclosed for example in U.S. Pat. No. 3,384,952, decreases the image size in two directions. And while the example given was an LCS device, the invention is applicable to displays incorporating programmable light emitting diodes.

While the invention has been described with reference to the structure disclosed, it is not confined to the details set forth, but is intended to cover such modifications or changes as may come within the scope of the following claims.

What is claimed is:

1. An image bar display comprising:
    a display panel disposed in a viewing plane;
    means for providing a light output at said display panel; and
    an optical device placed adjacent the display side of said panel, said optical device adapted to increase the view angle of the displayed image by decreasing the size of the displayed image in at least one direction.

2. The device according to claim 1 wherein the optical device is a negative cylinder lens.

3. A device according to claim 1 wherein said panel is a liquid crystal display assembly comprising:
    a liquid crystal material contained between two transparent electrodes;
    a variable voltage source connected across said electrodes; and
    an illumination means to direct light through the nondisplay face of said liquid crystal layer.

* * * * *